United States Patent
Frey, Jr. et al.

(10) Patent No.: US 9,933,449 B2
(45) Date of Patent: Apr. 3, 2018

(54) METHOD AND SYSTEM OF MEASUREMENT OF MACH AND DYNAMIC PRESSURE USING INTERNAL SENSORS

(71) Applicant: BAE Systems Information and Electronic Systems Integration Inc., Nashua, NH (US)

(72) Inventors: Robert D. Frey, Jr., Bolton, MA (US); David J. Schorr, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 301 days.

(21) Appl. No.: 14/818,432

(22) Filed: Aug. 5, 2015

(65) Prior Publication Data

US 2016/0041196 A1    Feb. 11, 2016

Related U.S. Application Data

(60) Provisional application No. 62/033,194, filed on Aug. 5, 2014.

(51) Int. Cl.
*G01P 5/14*  (2006.01)
*G01P 5/02*  (2006.01)
*G01P 15/00* (2006.01)

(52) U.S. Cl.
CPC ............. *G01P 5/14* (2013.01); *G01P 5/02* (2013.01); *G01P 15/00* (2013.01)

(58) Field of Classification Search
CPC ...... G01P 5/02; G01P 5/14; G01P 5/16; G01P 15/00; G01P 21/025
See application file for complete search history.

(56) References Cited

U.S. PATENT DOCUMENTS

| | | | |
|---|---|---|---|
| 2012/0226395 A1* | 9/2012 | Revol | G01C 21/16 701/4 |
| 2015/0057960 A1* | 2/2015 | Dupont De Dinechin | G01P 13/025 702/98 |

* cited by examiner

*Primary Examiner* — Bryan Bui
(74) *Attorney, Agent, or Firm* — Hayes Soloway

(57) ABSTRACT

A system for calculating airspeed and dynamic pressure comprises a system body, an internal accelerometer, located within the system body, an internal pressure sensor, located in the system body, the internal pressure sensor being not hermetically sealed within the system body and capable of measuring the static pressure of the ambient atmosphere, and a processor in reception of the internal accelerometer, and the internal pressure sensor, capable of calculating Mach number via an axial acceleration, and capable of calculating a dynamic pressure and a true airspeed via the Mach number.

19 Claims, 9 Drawing Sheets

METHOD AND SYSTEM OF MEASUREMENT OF MACH AND DYNAMIC PRESSURE USING INTERNAL SENSORS

CROSS REFERENCE TO RELATED APPLICATION

This application claims benefit of U.S. Provisional Application Ser. No. 62/033,194 entitled, "Method and System of Measurement of Mach and Dynamic Pressure using Internal Sensors" filed Aug. 5, 2014, the entire disclosure of which is incorporated herein by reference.

STATEMENT OF GOVERNMENT INTEREST

This invention was made with United States Government support under Contract No. N00019-11-C-0033 awarded by the Dept. of the Navy. The United States Government has certain rights in this invention.

FIELD OF THE INVENTION

The present invention relates to autopilot control of munitions such as missiles and other ordinance and more particularly to the measurement of Mach number and dynamic pressure utilizing sensors solely within the missile or ordinance.

BACKGROUND OF THE INVENTION

Mach number, dynamic pressure and airspeed are typically used to set the gain of autopilots and measuring these parameters typically relies on devices that must extend into the free airstream. For example, pitot tubes determine dynamic pressure by measuring the difference between free airstream total pressure and static pressure. The extension of these tubes into the free airstream can be an inconvenience, particularly in rocket and munition applications. In addition, the tube can become clogged with debris impacting the accuracy of the measurements from which one can calculate gains for an autopilot.

Autopilots have been used in the control and guidance of ordinances including rockets, mortars and the like. The purpose of the autopilot is to maintain stable flight and in order to do so various gain parameters of the autopilot must be set. The gain parameters are critically dependent upon dynamic pressure and heretofore preprogrammed flight of these munitions has been used to predict the dynamic pressure that will be encountered by the munition which varies with time over the trajectory of the munition. Thus, in prior systems guidance for these munitions used preprogrammed scheduling involving gain parameters that varied over time in accordance with a flight profile as well as being specific to a particular munition. The scheduling is heavily dependent on prediction of flight path and flight characteristics and does not take into account that differing flight paths are possible. It will therefore be appreciated that real time measurement of dynamic pressure would significantly improve the system performance since one would not have to rely on predicted gains from scheduling.

When these munitions are helicopter platform launched, their speeds are relatively low and any prediction of gain over time in this type of very constrained engagement scenario is relatively easy. However, if these autopilots are employed on munition fired from a fixed wing aircraft or jet aircraft flying at Mach speed, then a very dynamic condition may be obtained for which a time schedule is hard to predict, especially one that fits a range of platforms including both helicopters and jet aircraft.

Using a time based gain schedule assumes that all munitions fly the same profile and encounter the same sequence of events so that the schedule of the gains would be all exactly the same. However, the fact is that as time goes on, deviation further and further from the trajectory assumption occurs, and performance starts to suffer.

Moreover, for certain types of munitions the rocket or projectile is launched almost vertically and the time variation of the sequence of dynamic pressure and gain is a complicated process to predict. This is particularly true for a mortar type munition that follows a parabolic path and can be launched over a large range of initial velocities and elevation angles.

Dynamic pressure is a key measurement to the setting of gains for the autopilot. In the past, one method of measurement of dynamic pressure took place from the exterior of the munition using pitot tubes. However these pitot tubes and other sensors that project beyond the skin of the munition or vehicle oftentimes produce unreliable results. Moreover, sensors mounted to the exterior of a munition can be damaged in transport or during launch under a high G environment. Moreover, when a rocket is launched out of a tube, with a neighboring rocket launched just before, the adjacent rocket is subjected to a backwash of exhaust fumes that can potentially clog the pitot tube and therefore change its performance characteristic.

Thus, a heretofore unaddressed need exists in the industry to address the aforementioned deficiencies and inadequacies.

SUMMARY OF INVENTION

Embodiments of the present disclosure provide a system and method for calculating airspeed and dynamic pressure. Briefly described, in architecture, one embodiment of the system, among others, can be implemented as follows. The system includes a system body. An internal accelerometer is located within the system body. An internal pressure sensor is located in the system body, wherein the internal pressure sensor is not hermetically sealed within the system body and capable of measuring the static pressure of the ambient atmosphere. A processor is coupled to the internal accelerometer and the internal pressure sensor for calculating Mach number from the axial acceleration detected by said internal accelerometer, and for calculating dynamic pressure and true airspeed utilizing the calculated Mach number.

The present disclosure can also be viewed as providing a method of measuring airspeed and dynamic pressure. In this regard, one embodiment of such a method, among others, can be broadly summarized by the following steps: providing a system body with an internal accelerometer and an internal pressure sensor, the system body moving in a direction; measuring a deceleration of the system body in the direction that the system body is moving; measuring a static pressure of an ambient atmosphere; calculating an axial acceleration of the system body from the measured deceleration; calculating a Mach number of the system body utilizing the calculated axial acceleration; and, calculating a dynamic pressure and a true airspeed using the calculated Mach number.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE INVENTION

Figure 1:
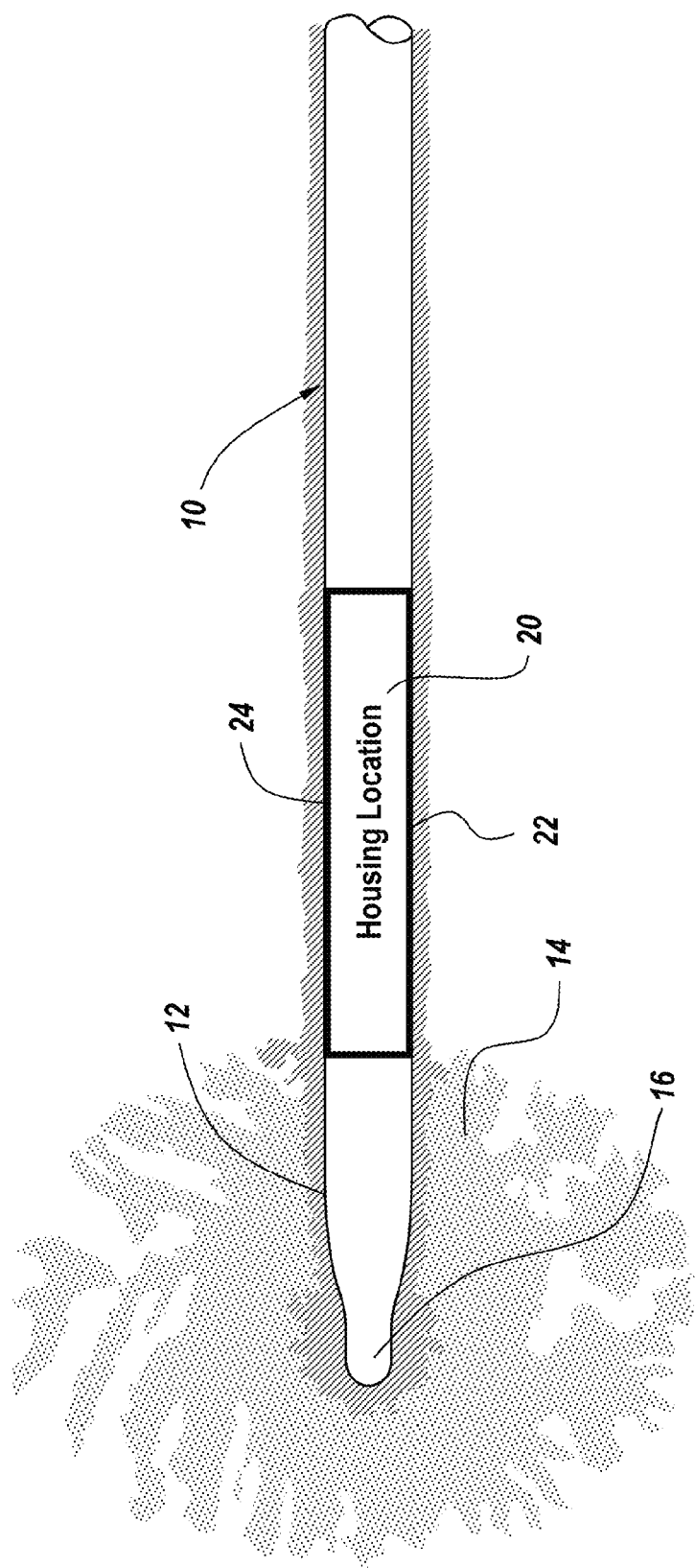
FIG. 1 is a diagrammatic illustration of the shockwave and pressure field for a missile, illustrating the housing location for internal sensors to detect dynamic pressure, in accordance with a first exemplary embodiment of the present disclosure.

It is the subject of the present invention to use internal sensors to establish dynamic pressure by measuring pressure internal to the munition as well as axial acceleration. By so doing, it is possible to establish Mach numbers and velocity critical to setting autopilot gain without having to measure dynamic pressure exterior to the vehicle or munition. Thus, sensors extending beyond the skin of the munition are not required. As a result, sensors to establish Mach number and velocity are maintained within the body of the vehicle without any need for extension outside in the airstream.

More specifically, this invention provides the means to measure dynamic pressure and Mach velocity using internal sensors. Dynamic pressure and Mach number are key parameters in the control of the airframe as variation in these two parameters dominate the time varying response of the system. Knowledge of dynamic pressure and Mach number permit implementation of an adaptive control system allowing for optimum airframe performance. With the addition of a temperature measurement, the air velocity can be determined.

According to an embodiment, a system for calculating airspeed and dynamic pressure includes a system body, an internal accelerometer located within the system body, an internal pressure sensor located in the system body, the internal pressure sensor being not hermetically sealed within the system body and capable of measuring the static pressure of the ambient atmosphere. A processor is provided to receive signals from the internal accelerometer and the internal pressure sensor to be able to calculate Mach number via sensing axial acceleration and internal pressure. In turn, it is possible to calculate dynamic pressure and a true airspeed from the Mach number.

The system may further utilize a temperature sensor capable of measuring ambient air temperature outside of the system body. Moreover, the internal accelerometer may be located at the center of gravity of the system body. The system body may also include entry ports situated to equalize pressure inside and outside of the system body.

According to an additional embodiment, a method of measuring airspeed and dynamic pressure comprises providing a system body having an internal accelerometer and an internal pressure sensor, the system body moving in a direction, measuring the deceleration of the system body in the direction that the system body is moving, measuring the static pressure of the ambient atmosphere, calculating the axial acceleration of the system body, calculating a Mach number of the system body utilizing axial acceleration, and calculating the dynamic pressure and the true airspeed from the calculated Mach number.

The method may further include measuring the air temperature outside the system body with a temperature sensor. The method may also include filtering the calculated Mach number prior to calculating the dynamic pressure and the true airspeed, with the filter including a Kalman filter.

Referring now to FIG. 1, it will be appreciated that supersonic flight poses severe dynamic pressure measuring problems when, for instance, pitot tubes are in the air flow in which the airflow is determined by the shape of the missile and/or accompanying wings or fins. It will be shown that the effect of supersonic shockwaves can be ignored, giving rise to the ability to measure dynamic pressure and Mach number with sensors internal to the missile body.

FIG. 1 is a diagrammatic illustration of the shockwave and pressure field for a missile, illustrating the housing location for internal sensors to detect dynamic pressure, in accordance with a first exemplary embodiment of the present disclosure. In FIG. 1, a missile 10 is depicted having a warhead 12 which, when launched, results in a shockwave 14 off the nose 16 of the warhead. This shockwave exists ahead of a housing location 20 for internally carried munitions sensors which seek to determine the dynamic pressure at the sides of housing 20, namely at locations 22 and 24 on the top and bottom of the missile.

Figure 2:
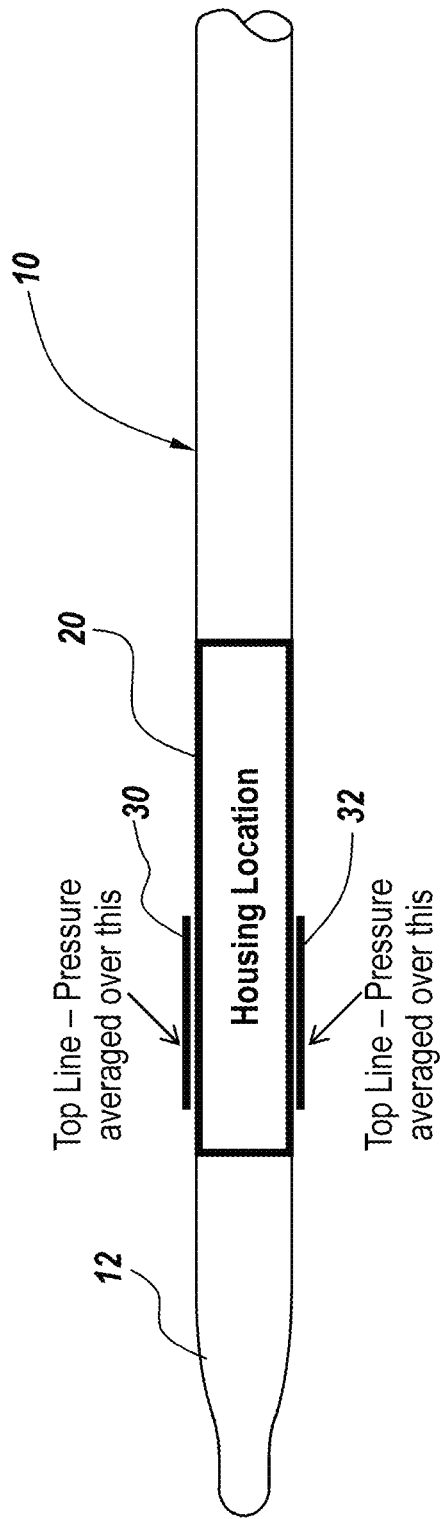
FIG. 2 is a diagrammatic illustration of the missile of FIG. 1 showing the housing location, also indicating topline pressure averaged over a length on the housing, in accordance with the first exemplary embodiment of the present disclosure.

FIG. 2 is a diagrammatic illustration of the missile of FIG. 1 showing the housing location, also indicating topline pressure averaged over a length on the housing, in accordance with the first exemplary embodiment of the present disclosure. As shown in FIG. 2, the housing 20 is shown with areas 30 and 32, over which topline pressure is averaged.

Figure 3:
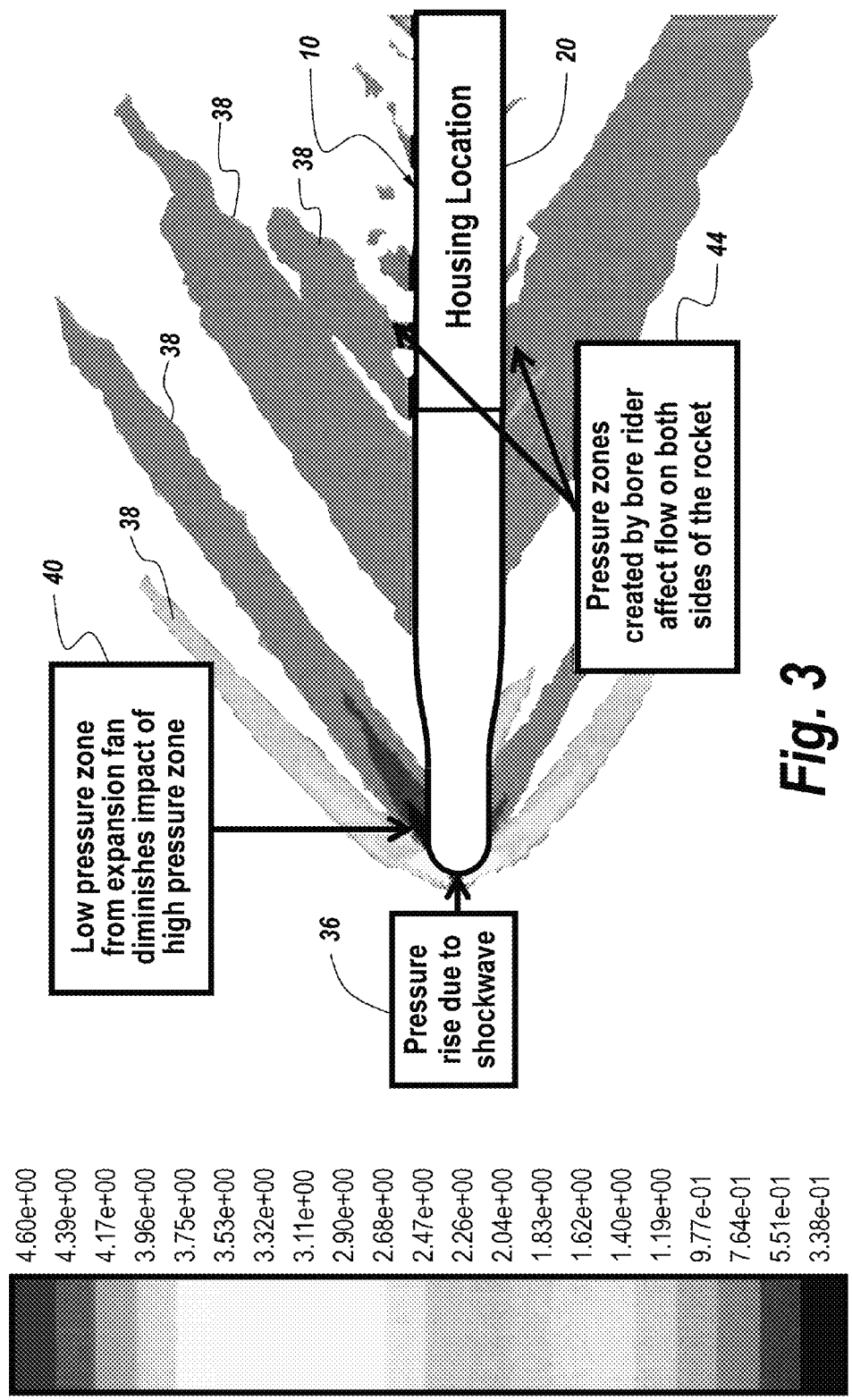
FIG. 3 is a diagrammatic illustration of the shockwave induced by the missile of FIG. 1 illustrating the pressure due to the shockwave, the low pressure zone from an expansion fan that diminishes impact of the high pressure zone and the pressure zones created by the borer rider affect flow on both sides of the missile, in accordance with the first exemplary embodiment of the present disclosure.

FIG. 3 is a diagrammatic illustration of the shockwave induced by the missile of FIG. 1 illustrating the pressure due to the shockwave, the low pressure zone from an expansion fan that diminishes impact of the high pressure zone and the pressure zones created by the borer rider affect flow on both sides of the missile, in accordance with the first exemplary embodiment of the present disclosure. As can be seen in FIG. 3, during supersonic flight there is a pressure rise due to the shock wave as illustrated at 36, with the resultant shockwaves illustrated at 38. As illustrated at 40, a low-pressure zone from the expansion fan diminishes the impact of the high-pressure zone, with the pressure zones as illustrated at 44 created by flow on both sides of housing 20.

From the above FIGS. 1-3, it can be seen that the rise in pressure from the shockwave of the nose of the warhead is abated by the expansion fan created when the warhead nose geometry turns parallel to the flow. Moreover, the nose of the warhead creates a slight pressure loss due to the occurrence of an expansion fan. This is observable at the housing for low angles of attack on both sides of the housing. At high angles of attack, this shockwave at the nose creates a pressure rise on the bottom of the housing, increasing the pressure at that location. On the other side of the missile, the expansion fan dominates and creates a pressure loss in line with what is seen at low angles of attack.

When the average pressure ratio is taken, the pressure uncertainty actually drops with increasing angle of attack due to nonlinear effects on each side of the missile nullifying each other. This means that shockwaves on the bottom of the missile create a pressure rise that is nullified by expansion fans on the top of the missile that create pressure loss.

The net result is that shockwave-induced phenomena are nullified giving rise to the ability to utilize internal sensors to calculate both dynamic pressure and Mach number as well as velocity. While the averaging of the high and low pressure does not perfectly cancel, the residual error in pressure measurement can be characterized during wind tunnel testing specific to the missile or munition and applied to the solution. How this static pressure measurement is used to determine dynamic pressure and Mach utilizing internal sensors is now discussed.

Figure 4:
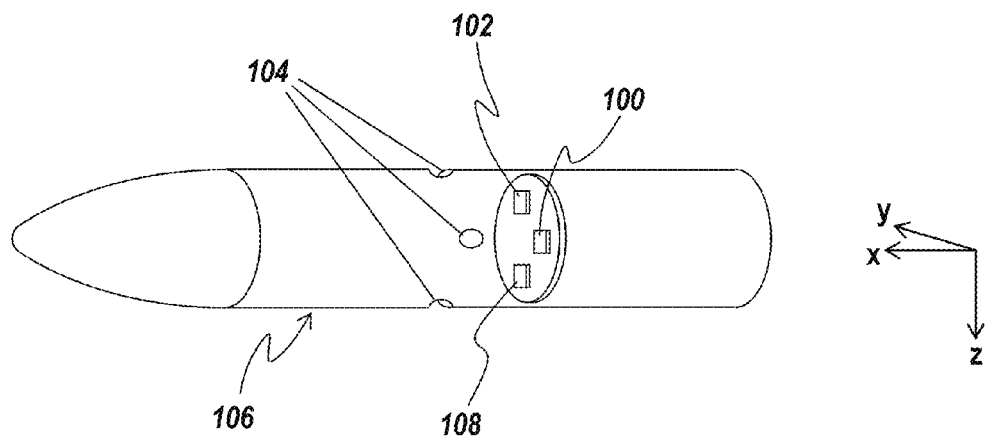
FIG. 4 is a diagrammatic illustration of a missile showing internally carried sensors for the determination of dynamic pressure and Mach number as well as velocity for the gain settings for an internally carried auto gyro, in accordance with the first exemplary embodiment of the present disclosure.

FIG. 4 is a diagrammatic illustration of a missile showing internally carried sensors for the determination of dynamic pressure and Mach number as well as velocity for the gain settings for an internally carried auto gyro, in accordance with the first exemplary embodiment of the present disclosure. As shown in FIG. 4, there are a number of internal sensors that are utilized within the missile housing. These include an accelerometer 100 placed within the body of system 106 that measures the deceleration along the x axis of the missile. Preferably, the sensing axis of the accelerometer is mounted along the longitudinal axis of the airframe coincident with the CG of the system. If using a triaxial arrangement of accelerometers, other mounting orientations are allowable as the acceleration along x can be calculated using the measurement of the acceleration vector and knowledge of the orientation of the device. Mounting at locations other than the CG may require the addition of a gyroscope to compensate for centripetal accelerations using compensate techniques well understood by those practiced in the art.

Pressure sensor 102 is also placed within the body of system 106. The pressure sensor must be able to observe the static pressure of the ambient atmosphere. It therefore cannot be hermetically sealed within the body of system 106. Entry ports 104 are provided to equalize pressure inside and outside the body. These entry ports can be purposely added ports or they may be provided by the access provided by deployed wing surfaces. In addition, care must be taken in the placement of the access ports relative to the shock wave generated by leading surfaces of the airframe. They must either be placed at sufficient distance to eliminate pressure variation from the shock wave or calibrated to account for the pressure offset as a function of Mach.

Optionally, a temperature sensor 108 can be included for the purposes of relating Mach to true airspeed. The temperature sensor needs to measure ambient air temperature outside of the body. This can be a difficult requirement as every mounting surface in the system has an inherent delay in temperature due to the thermal capacitance of the materials. In addition, electronics housed within the body of the system tend to heat the enclosed housing, causing a differential in temperature relative to free stream air temperature. The inherent accuracy of a true airspeed measurement is dependent on proper placement of the temperature sensor.

Figure 5:
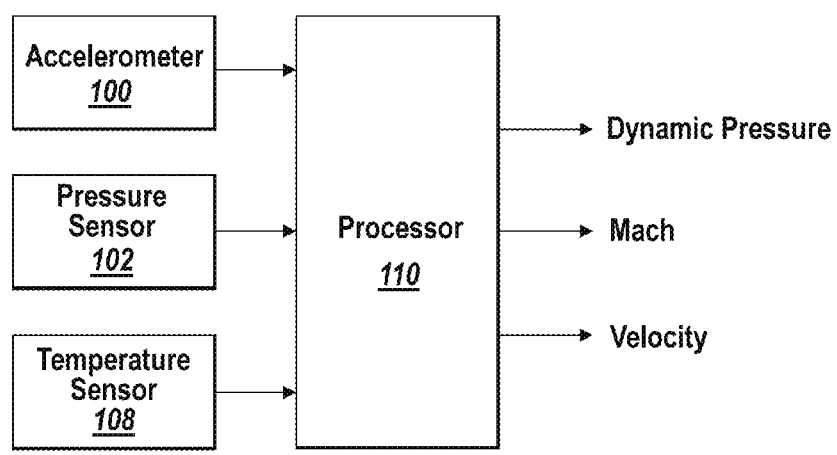
FIG. 5 is a block diagram of the method of calculating Mach number, dynamic pressure and velocity from measurements taken internal to the missile of FIG. 4, in accordance with the first exemplary embodiment of the present disclosure.

FIG. 5 is a block diagram of the method of calculating Mach number, dynamic pressure and velocity from measurements taken internal to the missile of FIG. 4, in accordance with the first exemplary embodiment of the present disclosure. As shown, the accelerometer 100 and pressure sensor 102 may be interfaced to processor 110 which computes Dynamic pressure and Mach. A temperature sensor 108 also may be coupled to processor 110 to allow for the calculation of true airspeed.

The axial acceleration of the air vehicle is completely described by the following equation:

$$a_x = \frac{qS}{m}[C_{aOB}(v_m, \alpha, \varphi) + C_{adp}(v_m, \theta_p, \alpha, \varphi) + C_{ady}(v_m, \theta_y, \alpha, \varphi) + C_{adr}(v_m, \theta_r, \alpha, \varphi)] \quad (1)$$

where q is the dynamic pressure, S is the reference area, m is the mass, $C_{aOB}$ is the drag coefficient for the body, dependent on Mach velocity ($v_m$) angle of attack ($\alpha$) and roll angle $\varphi$. $C_{adp}$ is the pitch command drag coefficient with an additional variation with pitch "flap" command angle $\theta_p$, $C_{adr}$ is the roll command drag coefficient with an additional variation in roll "flap" command angle $\theta_r$, and $C_{adv}$ is the yaw command drag coefficient with an additional variation in yaw "flap" command angle $\theta_y$. The drag coefficients are determined by measurements in a wind tunnel.

This equation can be approximated by eliminating the flap drag terms. The flap drag under normal operating conditions is much smaller than the body drag. The second approximation is to assume that the angle of attack is zero. Projectiles and rockets typically operate at low angles of attack. Also, the deviation in angle of attack is rapid compared to the rate of change of the Mach velocity and therefore any drag variation due to flap commands can be considered to be noise. The equation therefore simplifies to equation (2):

$$a_x \approx \frac{qS}{m} C_{a0B}(v_m, 0, 0) = \frac{qS}{m} C'_{a0B}(v_m) \qquad (2)$$

Dynamic pressure, q, is related to Mach as showing in equation (3):

$$q = \frac{\gamma P v_m^2}{2} \qquad (3)$$

Where $\gamma$ is the ratio of specific heats, equal to 1.4 for air, and P is the static pressure. Substituting equation (3) into equation (2) and rearranging produces a direct relationship between the Mach velocity and the measured axial acceleration and pressure as shown in equation (4):

$$H_{a_xP}(v_m) = \frac{\gamma v_m^2 S}{2m} C'_{a0B}(v_m) \approx \frac{a_x}{P} \qquad (4)$$

Figure 6:
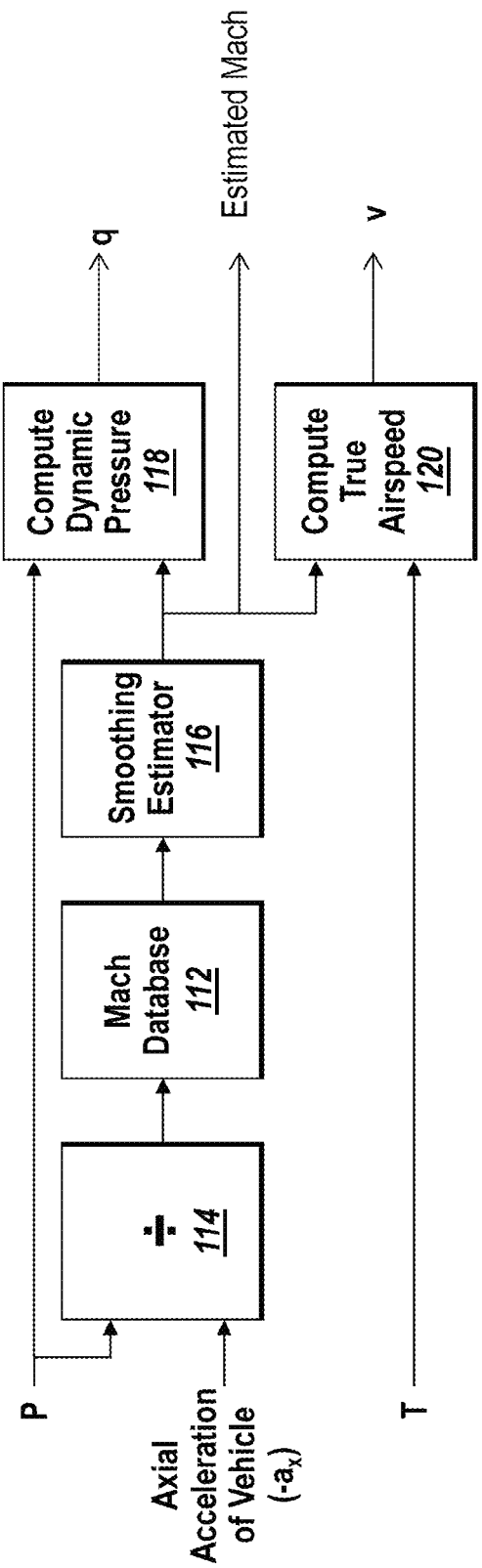
FIG. 6 is a block diagram showing the use of internally sensed pressure, axial acceleration and temperature to compute dynamic pressure and true airspeed, in accordance with the first exemplary embodiment of the present disclosure.
Figure 7:
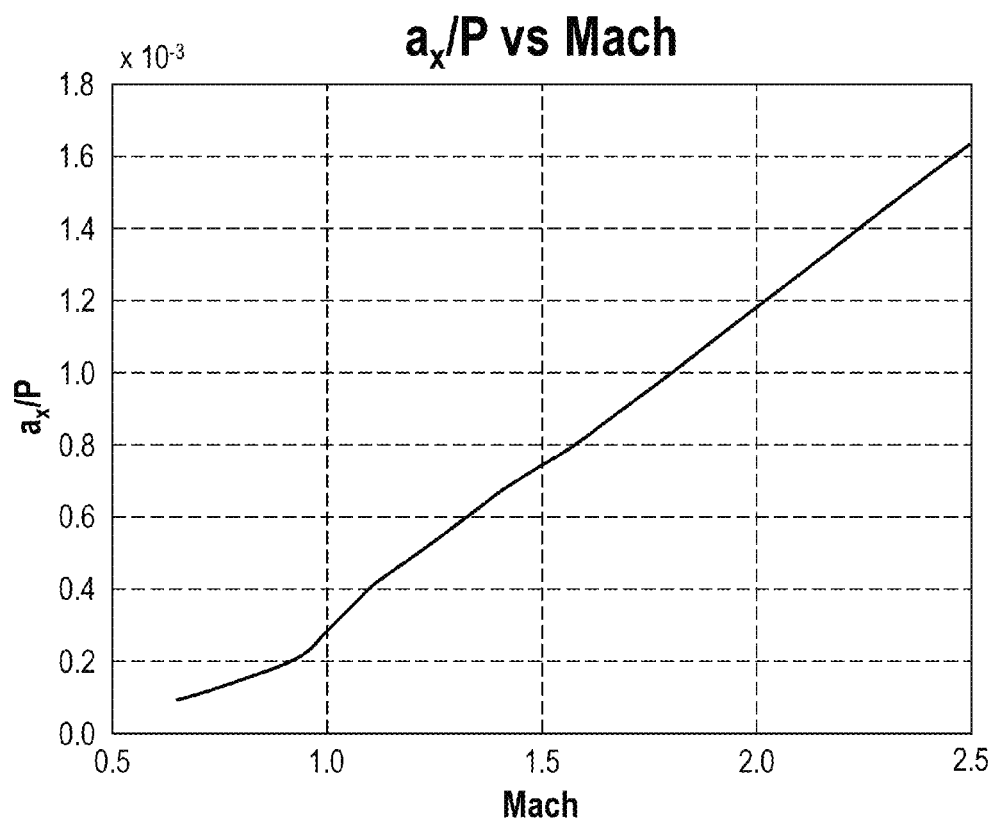
FIG. 7 is a graph showing axial acceleration divided by internal pressure graphed against Mach number showing a relative linear relationship therebetween, in accordance with the first exemplary embodiment of the present disclosure.

FIG. 6 is a block diagram showing the use of internally sensed pressure, axial acceleration and temperature to compute dynamic pressure and true airspeed, in accordance with the first exemplary embodiment of the present disclosure. Relative to FIG. 6, in one example rocket design, equation 4 was evaluated to establish the Mach database 112 and is plotted in FIG. 7, which is a graph showing axial acceleration divided by internal pressure graphed against Mach number showing a relative linear relationship therebetween, in accordance with the first exemplary embodiment of the present disclosure. In one embodiment, the Mach database may be a Mach lookup table. In actual application, this relationship would be measured in wind tunnel testing and would account for the difference between true static pressure and the sensed pressure due to the internal location of the sensor and the shock wave external to the missile or projectile specific to that missile or projectile design.

Referring back to FIG. 6, the measured deceleration ($-a_x$) is divided at 114 by the measured pressure (P) and applied to Mach database 112 to determine a measured Mach.

Figure 8:
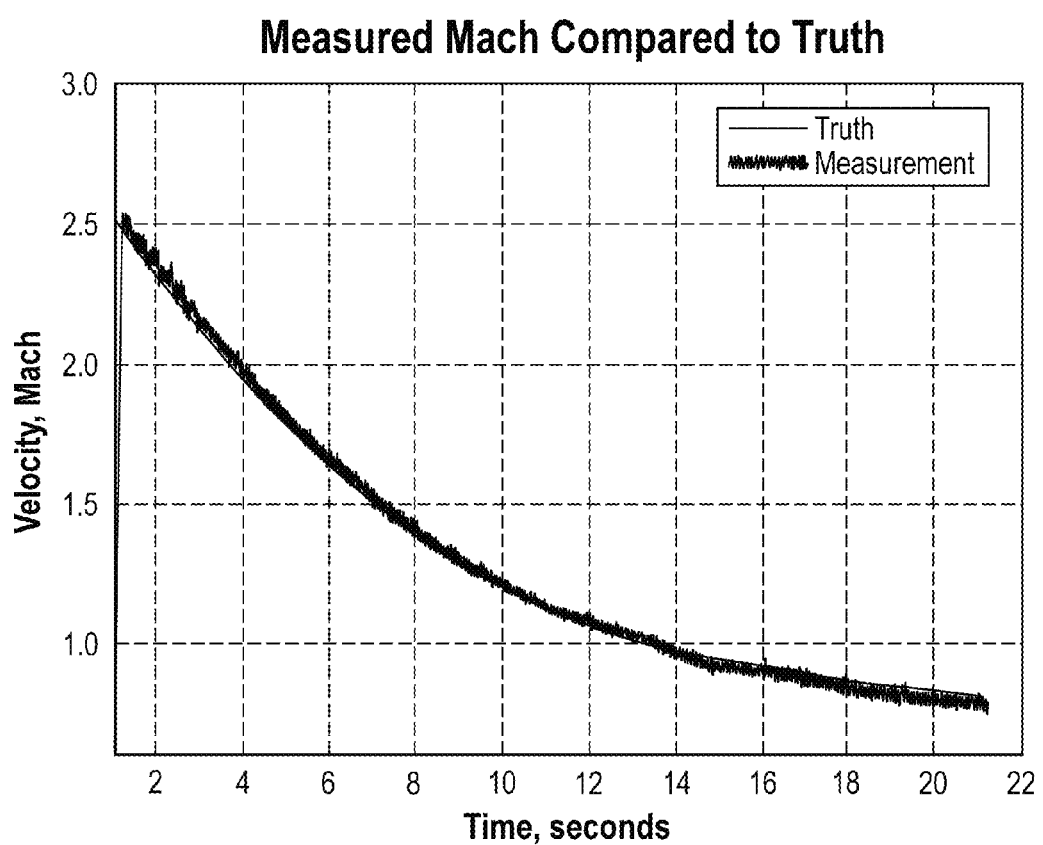
FIG. 8 is a graph showing measured Mach numbers over time compared to actual Mach numbers showing substantial agreement between the two, in accordance with the first exemplary embodiment of the present disclosure.
Figure 9:
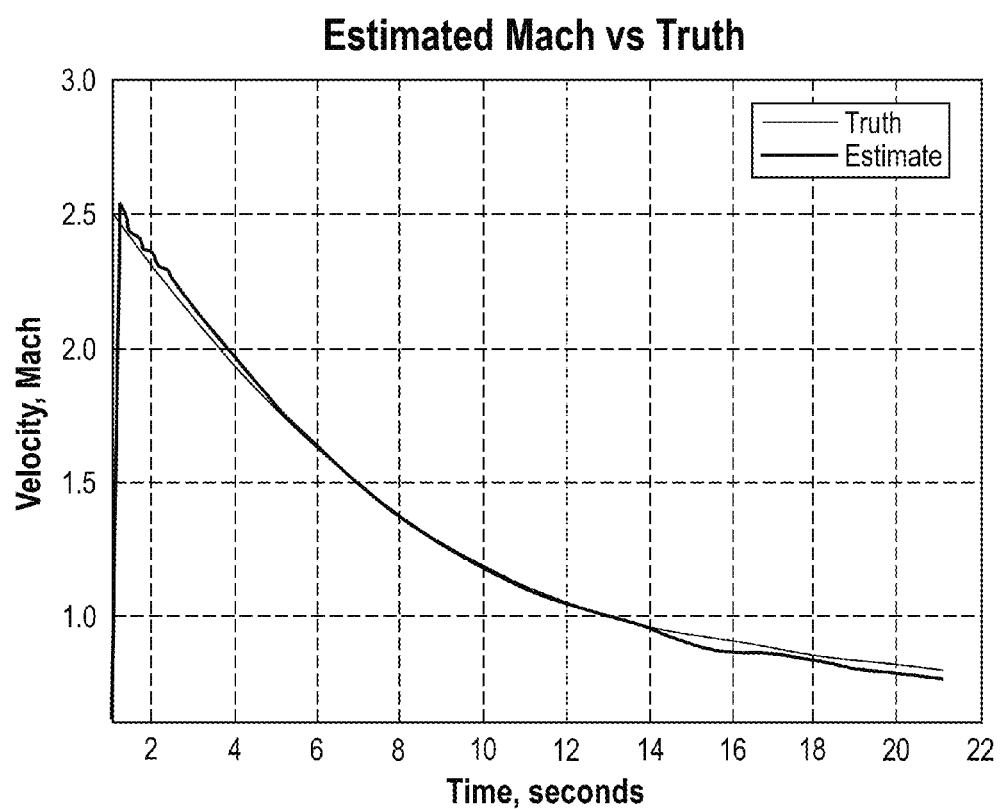
FIG. 9 is a graph showing estimated Mach numbers over time versus actual Mach numbers showing substantial agreement when utilizing the subject system, in accordance with the first exemplary embodiment of the present disclosure.

FIG. 8 is a graph showing measured Mach numbers over time compared to actual Mach numbers showing substantial agreement between the two, in accordance with the first exemplary embodiment of the present disclosure. Specifically, an example of the Mach measurement compared to the actual Mach is shown in FIG. 8. The measured Mach is corrupted by accelerometer measurement noise and drag variation resultant from angle of attack variation and control surface variation previously assumed to be zero. Using this raw Mach may be satisfactory though it can lead to an unexpected feedback path if Mach measurement is used to directly set the system gains. The actual Mach is relatively slowly varying. The "measured" Mach can be optionally filtered to smooth these unexpected variations. The preferred implementation for smoothing filter 116 is a Kalman Estimator. The Kalman Estimator provides the most rapid convergence of initial error compared to other estimators like the constant gain alpha-beta trackers. Low pass filtering tends to also converge slowly from initial errors and create significant lag in response compared to an estimator. An example of the smoothed output is shown in FIG. 9, which is a graph showing estimated Mach numbers over time versus actual Mach numbers showing substantial agreement when utilizing the subject system, in accordance with the first exemplary embodiment of the present disclosure.

Referring back to FIG. 6, the dynamic pressure is computed from the estimated mach. The compute dynamic pressure block 118 implements the relationship described by equation 3. The compute true airspeed block 120 is used to convert Mach to true airspeed. This block implements the relationship described by equation 5.

$$v = \sqrt{\gamma R T v_m} \qquad (5)$$

Where R is equal to specific gas constant for air, generally it assumes the dry air value of 287 J/kg/K unless other information is available.

While the previous example showed a simplification that eliminated drag induced by control flap variations, the approach as illustrated can be further improved by accounting for the drag as a function of drag angle. In this case, the axial drag coefficient used in equation 1 would be likewise simplified assuming a zero degree angle of attack but account for the commanded control flap angle as described in equation 6.

$$C'_a = C_{a0B}(v_m, 0, 0) + C_{adp}(v_m, \theta_p, 0, 0) + C_{ady}(v_m, \theta_y, 0, 0) + C_{adr}(v_m, \theta_r, 0, 0) \qquad (6)$$

The revised relationship between Mach and the ratio of measured drag to measured pressure would now include additional variables to account for the added drag of the measured commanded flap angles.

$$H_{a_xP}(v_m, \theta_p, \theta_y, \theta_r) = \frac{a_x}{P} \approx \frac{\gamma v_m^2 S}{2m} C'_a(v_m, \theta_p, \theta_y, \theta_r)$$

The Mach database 112 would now be a multidimensional relationship, or polynomial fit, that includes the measured flap angles along with the ratio of the measured axial acceleration and pressure.

Figure 10:
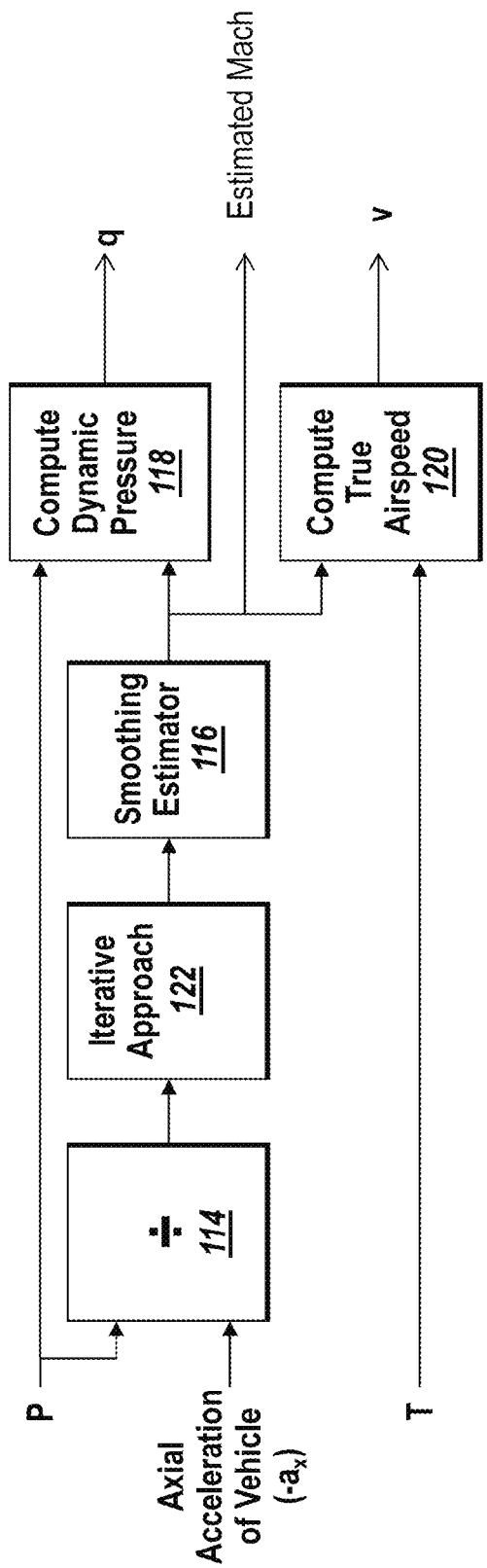
FIG. 10 is a block diagram showing the use of internally sensed pressure, axial acceleration and temperature to compute dynamic pressure and true airspeed, in accordance with the first exemplary embodiment of the present disclosure.

FIG. 10 is a block diagram showing the use of internally sensed pressure, axial acceleration and temperature to compute dynamic pressure and true airspeed, in accordance with the first exemplary embodiment of the present disclosure. In contrast to the processing diagram of FIG. 6, in another embodiment of the present invention, it may be possible to solve for the Mach using an iterative approach 122. For example, in the iterative approach, it is possible to vary the Mach until the appropriate matching drag to pressure ratio is achieved. This process could be used to replace the database 112. The remaining portions of the diagram shown in FIG. 10 would be as described relative to FIG. 6.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A system for calculating airspeed and dynamic pressure, comprising:
    a system body;
        wherein the system body comprises entry ports situated to equalize pressure inside and outside of the system body;
    an internal accelerometer located within the system body;

an internal pressure sensor located in the system body, the internal pressure sensor not hermetically sealed within the system body and capable of measuring the static pressure of the ambient atmosphere; and, a processor coupled to the internal accelerometer and the internal pressure sensor for calculating Mach number from an axial acceleration detected by said internal accelerometer and the static pressure of the ambient atmosphere measured by the internal pressure sensor, and for calculating dynamic pressure utilizing the calculated Mach number.

2. The system of claim 1, further comprising a temperature sensor capable of measuring an ambient air temperature outside of the system body and coupled to the processor for calculating a true airspeed.

3. The system of claim 1, wherein the internal accelerometer is located at the center of gravity of the system body.

4. The system of claim 1, further comprising angle sensors to measure the angles of the control flaps.

5. The system of claim 1, wherein the processor calculates the Mach number using a Mach lookup table.

6. The system of claim 1, wherein the processor calculates the Mach number using a multidimensional polynomial fit.

7. The system of claim 1, wherein the processor calculates the Mach number using an iterative approach, wherein Mach is varied.

8. A method of measuring airspeed and dynamic pressure to stabilize a flight of a guided projectile, comprising the steps of:
providing a system body with an internal accelerometer and an internal pressure sensor, the system body moving in a direction;
measuring a deceleration of the system body in the direction that the system body is moving with the internal accelerometer;
measuring a static pressure of an ambient atmosphere with the internal pressure sensor;
calculating an axial acceleration of the system body from the measured deceleration;
calculating a Mach number of the system body utilizing the calculated axial acceleration and the static pressure of the ambient atmosphere measured by the internal pressure sensor;
calculating a dynamic pressure using the calculated Mach number; and
providing the dynamic pressure as input to a gain of an autopilot of the guided projectile;
whereby the flight of the guided projectile is stabilized.

9. The method of claim 8, further comprising measuring the air temperature outside the system body with a temperature sensor for calculating a true airspeed.

10. The method of claim 8, further comprising measuring a control flap angle of a control flap of the system body with an angle sensor.

11. The method of claim 8, further comprising filtering the calculated Mach number prior to calculating the dynamic pressure and the true airspeed.

12. The method of claim 11, wherein the step of filtering includes a Kalman filter.

13. The method of claim 8, wherein calculating the Mach number of the system body further comprises calculating the Mach number using a Mach lookup table.

14. The method of claim 8, wherein calculating the Mach number of the system body further comprises calculating the Mach number using a multidimensional polynomial fit.

15. The method of claim 8, wherein calculating the Mach number of the system body further comprises calculating the Mach number using an iterative approach, wherein Mach is varied.

16. The method of claim 8 further comprising:
measuring an air temperature outside the system body with an internal temperature sensor capable of measuring an ambient air temperature outside of the system body;
wherein the ambient air temperature is used to provide an input to the gain of the autopilot of the guided projectile.

17. The method of claim 8 wherein the internal pressure sensor comprises:
air pressure input to ports situated on opposite sides of the system body whereby shockwaves on a bottom of the guided projectile create a pressure rise that is nullified by expansion fans on a top of the guided projectile that create pressure loss wherein a net result is that shockwave-induced phenomena are nullified, whereby internal sensors can calculate both dynamic pressure and Mach number.

18. The method of claim 8 wherein a relationship between Mach and a ratio of measured drag to measured pressure comprises:

$$H_{a_x P}(v_m, \theta_p, \theta_y, \theta_r) = \frac{a_x}{P} \approx \frac{\gamma v_m^2 S}{2m} C'_a(v_m, \theta_p, \theta_y, \theta_r)$$

where:
H is a relationship between Mach and a ratio of measured drag to measured pressure;
$a_x$ is an axial acceleration;
P is a static pressure;
$\theta$ is a commanded flap angle;
$v_m$ is a Mach velocity;
m is a mass;
$\gamma$ is a ratio of specific heats; and
$C'_a$ is a drag coefficient.

19. A guided projectile comprising an autopilot using calculated airspeed and dynamic pressure to stabilize a flight of the guided projectile comprising:
a system body of the guided projectile;
an internal accelerometer located within the system body at a center of gravity of the body;
an internal pressure sensor located in the system body comprising entry ports situated to equalize pressure inside and outside of the system body, the internal pressure sensor not hermetically sealed within the system body and capable of measuring the static pressure of the ambient atmosphere;
an internal temperature sensor located in the system body, capable of measuring an ambient air temperature outside of the system body for calculating true airspeed;
at least one angle sensor to measure angles of control flaps;
a processor coupled to the internal accelerometer, the internal pressure sensor, the internal temperature sensor, and the at least one control flap angle sensor for calculating Mach number from an axial acceleration detected by the internal accelerometer and the static pressure of the ambient atmosphere measured by the internal pressure sensor, and for calculating dynamic pressure and true airspeed utilizing a filtered calculated Mach number;

wherein the dynamic pressure and true airspeed are input to a gain of the autopilot;

whereby the flight of the guided projectile is stabilized through the input to the gain of the autopilot.

* * * * *